United States Patent
Lipasti et al.

(10) Patent No.: US 10,013,048 B2
(45) Date of Patent: *Jul. 3, 2018

(54) RECONFIGURABLE EVENT DRIVEN HARDWARE USING RESERVOIR COMPUTING FOR MONITORING AN ELECTRONIC SENSOR AND WAKING A PROCESSOR

(71) Applicant: Wisconsin Alumni Research Foundation, Madison, WI (US)

(72) Inventors: Mikko H. Lipasti, Lake Mills, WI (US); Atif G. Hashmi, Madison, WI (US); Andrew Nere, Madison, WI (US); Giulio Tononi, Verona, WI (US)

(73) Assignee: National Science Foundation, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,571

(22) Filed: Dec. 1, 2016

(65) Prior Publication Data

US 2017/0083081 A1    Mar. 23, 2017

Related U.S. Application Data

(63) Continuation of application No. 13/749,854, filed on Jan. 25, 2013, now Pat. No. 9,541,982.

(51) Int. Cl.
*G06F 1/32* (2006.01)
*G06N 99/00* (2010.01)
*G06N 3/02* (2006.01)

(52) U.S. Cl.
CPC .......... *G06F 1/3293* (2013.01); *G06F 1/3206* (2013.01); *G06F 1/3209* (2013.01); *G06F 1/3215* (2013.01); *G06N 3/02* (2013.01); *Y02D 10/122* (2018.01)

(58) Field of Classification Search
None
See application file for complete search history.

(56) References Cited

U.S. PATENT DOCUMENTS

| | | | |
|---|---|---|---|
| 7,409,564 B2 | 8/2008 | Kump et al. |
| 8,029,431 B2 | 10/2011 | Tononi |
| 2002/0116196 A1 | 8/2002 | Tran |
| 2004/0015459 A1 | 1/2004 | Jaeger |

(Continued)

OTHER PUBLICATIONS

Little Rock: Enabling Efficient Continuous Sensing on Mobile Phones.

(Continued)

*Primary Examiner* — Kim Huynh
*Assistant Examiner* — Danny Chan
(74) *Attorney, Agent, or Firm* — Boyle Fredrickson, SC (57) ABSTRACT

The present inventors have recognized that proper utilization of reconfigurable event driven hardware may achieve optimum power conservation in energy constrained environments including a low power general purpose primary processor and one or more electronic sensors. Aspects of neurobiology and neuroscience, for example, may be utilized to provide such reconfigurable event driven hardware, thereby achieving energy-efficient continuous sensing and signature reporting in conjunction with the one or more electronic sensors while the primary processor enters a low power consumption mode. Such hardware is event driven and operates with extremely low energy requirements.

19 Claims, 3 Drawing Sheets

(56) References Cited

U.S. PATENT DOCUMENTS

2010/0302028 A1   12/2010   Desai et al.
2010/0312736 A1   12/2010   Kello
2012/0100895 A1    4/2012   Priyantha et al.
2012/0254878 A1   10/2012   Nachman et al.
2013/0165181 A1    6/2013   Hasegawa
2013/0262036 A1   10/2013   Narayanan et al.
2014/0149754 A1    5/2014   Silva et al.

OTHER PUBLICATIONS

National Science Foundation: I-Corps: Accurate and energy-efficiency sensory stream analysis via configurable trigger signature detection.

Real-Time Computing Without Stable States: A New Framework for Neural Computation Based on Perturbations, Maass, Wolfgang; Natschtager, Thomas; Markram, Henry (Nov. 2002).

Computational Models for Generic Cortical Microcircuits, In Computational Neuroscience: A Comprehensive Approach, Maass, Wolfgang; Natschlager, Thomas; Markram, Henry (2004).

RECONFIGURABLE EVENT DRIVEN HARDWARE USING RESERVOIR COMPUTING FOR MONITORING AN ELECTRONIC SENSOR AND WAKING A PROCESSOR

STATEMENT REGARDING FEDERALLY SPONSORED RESEARCH OR DEVELOPMENT

This invention was made with government support under 0702272 awarded by the National Science Foundation and HR0011-09-C-0002 awarded by the Department of Defense/DARPA. The government has certain rights in the invention.

CROSS-REFERENCE TO RELATED APPLICATIONS

This application claims priority to U.S. patent application Ser. No. 13/749,854, entitled "Reconfigurable Event Driven Hardware Using Reservoir Computing for Monitoring an Electronic Sensor and Waking a Processor," filed on Jan. 25, 2013, which is herein incorporated by reference.

BACKGROUND OF THE INVENTION

The present invention relates to sensory stream analysis, and in particular, to detection of trigger signatures from sensory streams in energy constrained environments.

Many electronic systems today rely on continuous sensing of real world information to guide in data collection, storage, analysis, computation, communication, decision making and/or actuation. The sensors and the first tier of the sensory processing systems are often deployed in energy constrained environments. Typically, the raw data stream must be in analyzed by a low power, general purpose primary processor or central processing unit ("CPU") for temporal and spatial trigger signatures that either identify that an event of interest has occurred, or, conversely, rule out such an event. Trigger signatures can be detected flexibly in software executing on the primary processor by analyzing the raw data stream as it arrives, but this often requires a significant energy budget due to the ongoing use of the primary processor, particularly for continuous and/or high volume data streams.

Such continuous sensing applications are becoming increasingly commonplace for medical, health, and safety monitoring of critical sensory data streams, such as human electrocardiograph ("EKG"), electroencephalograph ("EEG"), pulse, blood pressure, and patient activity levels. For example, human sleep characteristics may be monitored via an EEG monitoring slow wave activity of the brain, including as described in U.S. Pat. No. 8,029,431, "Method and Apparatus for Promoting Restorative Sleep" to Giulio Tononi, the contents of which are hereby incorporated by reference.

Continuous sensing applications are also becoming increasingly commonplace for environmental monitoring, such as emission levels, pollutant concentrations, or seismic data, and in the mobile space, including smart phones, tablets and other mobile computers. Such sensing may be used to trigger context and location aware computation and/or communication. For example, information sent from a 3-axis accelerometer in a mobile phone may be used to infer the type and level of activity of the user, either independently or in conjunction with other sensors. For example, entering the driver's seat of an automobile could generate an identifiable accelerometer signature which could be used to disable text messaging while driving. The ability to continuously deploy flexible sensing and processing for these and other applications has the potential to revolutionize these fields. However, energy constraints often limit the development of such applications.

Typically, within the context of energy constrained battery-operated systems, the primary processor that interfaces with and controls various sensors is designed to operate mainly for bursts of user activity. To optimize power dissipation and to improve the battery life of the system, such processors compute aggressively for short durations, which consume a significant amount of power, then enter a sleep/idle or low power consumption mode to save energy. Such designs rely on the assumption that periods of sleep will be significantly longer as compared to the periods of aggressive processing. This assumption does not hold true, however, for many continuous sensing applications. Since continuous sensing applications require the primary processor to continuously monitor the sensory streams, these applications expect the processor to be in the processing mode all the time, thereby causing the processor to continuously dissipate significant energy. Furthermore, the requirement of continuously or periodic sampling prevents the primary processor from going into the low power consumption mode which prevents the opportunity for saving further energy. This often drains battery-operated processing systems faster than would otherwise be the case.

Some designs have advocated using a low-power microcontroller interfaced with the primary processor to allow continuous sensing, which may be a separate physical chip or a separate core within the primary processor. Though helpful, such low-power implementations typically include a dedicated CPU and various memories and data paths, which still require far more energy, physical space and compute resources than necessary for continuously analyzing sensory stream data with the least amount of energy consumed.

SUMMARY OF THE INVENTION

The present inventors have recognized that proper utilization of reconfigurable event driven hardware which consumes very low power relative to the system, including with respect to the electronic sensor, without the overhead of a low-power microcontroller, may achieve optimum power conservation in such energy constrained environments. Accordingly, the present inventors have found that aspects of neurobiology and neuroscience may be utilized to provide reconfigurable event driven hardware achieving such energy-efficient continuous sensing and signature reporting in conjunction with one or more sensors and a primary processor. Such hardware is event driven and operates with extremely low energy requirements.

As described above, continuous sensing applications may include, but are not limited to, EKG, EEG, pulse, blood pressure, patient activity, environmental monitoring emission levels, pollutant concentrations, seismic data, military and healthcare, safety monitoring and mobile consumer devices. Devices deployed in such domains have access to sensors including, but not limited to, accelerometers, ambient light sensors, temperature sensors, humidity sensors, pressure sensors, microphones, imagers, optical proximity, touch sensors, low-power radio devices, gyroscopes, orientation sensors, EEG/EKG sensors, blood pressure sensors, pulse sensors, chemical sensors, breathalyzers, contaminant sensors, smoke/carbon monoxide sensors, radiation sensors, proximity sensors, and many more.

Reservoir computing is a known framework for computation like a neural network. Typically an input signal is fed into a fixed (random) dynamical system called reservoir and the dynamics of the reservoir map the input to a higher dimension. Then a simple readout mechanism is trained to read the state of the reservoir and map it to the desired output. The main benefit is that the training is performed only at the readout stage and the reservoir is fixed. "Liquid State Machines" and "Echo State Networks" are two major types of reservoir computing. Such networks may be composed of digitally implemented leaky "integrate-and-fire" neurons operating in a clocked manner. In an embodiment, reconfigurable event driven hardware may be implemented, at least in part, using a neural network.

The proposed reconfigurable event driven hardware enables extremely low-power continuous monitoring of the aforementioned sensors within different applications by offloading the sampling and signature detection tasks from the primary processor within a device having access to one or more sensors. This reconfigurable hardware interfaces and interacts with the available sensors and continuously monitors their states and invokes the primary processor when a trigger signature is detected and further processing is necessary. This saves a significant amount of energy because, first, the primary processor can spend little to no power sampling the sensors, second, the primary processor may frequently enter a sleep/idle or low power consumption mode, and third, since the reconfigurable hardware is event driven, it will dissipate power primarily when it receives a sample of data from the available sensors.

In an embodiment, sensors are interfaced with a fully reconfigurable event driven hardware that continuously monitors the state of the sensors and only invokes the primary processor when a trigger signature is identified. The reconfigurable event driven hardware can be implemented as a separate integrated circuit chip or as a low-power compute resource within the primary processor. The energy constrained primary processor or a separate processor can configure the event driven hardware to monitor any number of sensors and any kind of spatial or temporal trigger signatures. The event driven hardware can also be reconfigured to detect trigger signatures that meet the demands of any user level application. Furthermore, if any application demands change, the hardware can be reconfigured during runtime to account for those changes. The event driven hardware can also be configured to concurrently monitor multiple sensors which allow the hardware to identify trigger signatures across a wide variety of sensory modalities.

These particular objects and advantages may apply to only some embodiments falling within the claims and thus do not define the scope of the invention.

BRIEF DESCRIPTION OF THE DRAWINGS

Embodiments of the invention will now be described, by way of example only, with reference to the accompanying drawings, in which.

DETAILED DESCRIPTION OF THE PREFERRED EMBODIMENT

Figure 1:
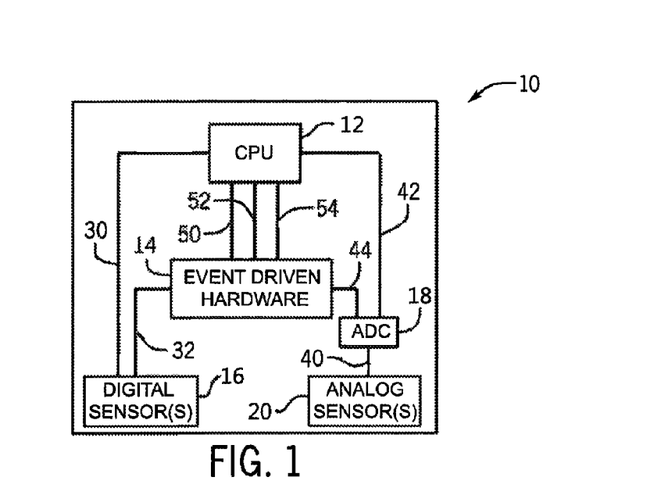
FIG. 1 is a logical diagram of a system with reconfigurable event driven hardware that continuously monitors the state of a plurality of sensors and invokes a primary processor when a trigger signature is identified thereby maximizing energy efficiency in accordance with an embodiment of the present invention.

Referring to FIG. 1, the present invention shall be described in the context of an electronic system 10 comprising a primary processor 12 coupled to a reconfigurable event driven hardware 14. The primary processor 12 may be low power, general purpose processor or CPU adapted to execute software. The primary processor 12 and the reconfigurable event driven hardware 14 are each coupled, in turn, to one or more digital sensors 16 and to one or more analog to digital converters ("ADC") 18. The ADC 18 is, in turn, coupled to one or more analog sensors 20.

The digital sensors 16 may include, for example, an accelerometer, compass, pressure sensor, temperature sensor or any other sensor amenable to digital sensing and sampling a condition as understood in the art. The analog sensors 20 may include, for example, a gyroscope, an EKG, an EEG or any other sensor amenable to analog sensing and sampling of a condition as understood in the art. Upon sensing real world information, the digital sensors 16 outputs a raw digital data stream 30 to the primary processor 12 and a raw digital data stream 32 to the reconfigurable event driven hardware 14. Similarly, upon sensing real world information, the analog sensors 20 output a raw analog data stream 40 to the ADC 18, which, in turn, digitally samples the raw analog data stream and produces a sampled digital data stream 42 coupled the primary processor 12 and a sampled digital data stream 44 coupled to the reconfigurable event driven hardware 14.

The digital sensors 16 and/or the analog sensors 20 may be adapted to continuously provide an output that reflects presently sensed conditions from each. The primary processor 12 may, in turn, continuously monitor the output data streams from each sensor, and may identify predetermined sensed conditions, or trigger signatures, from either. Trigger signatures may be spatial and/or temporal in nature as understood in the art, such as triggering upon reaching a particular acceleration and/or a particular period of time. Upon a trigger signature occurring, the primary processor 12 may invoke appropriate software routines to initiate any actions required in response to the identified trigger signatures.

The primary processor 12 can configure the reconfigurable event driven hardware 14 via a reconfiguration data path 50 to similarly continuously monitor the output data streams from the digital sensors 16 and/or the analog sensors 20 and similarly identify trigger signatures from either. Once configured, the reconfigurable event driven hardware 14 continuously monitors the output data streams and looks for trigger signatures. If the reconfigurable event driven hardware 14 detects a trigger signature, it invokes primary processor 12 through the control data path 52 and communicates the trigger signature details via a trigger data path 54 to the primary processor 12. At this point the processor 12 can invoke appropriate software routines to initiate any actions required in response to the identified trigger signature. Accordingly, the primary processor 12 may enter a sleep/idle or low power consumption mode, thereby saving overall energy in the system, while the reconfigurable event driven hardware 14 continues to monitor the sensors for trigger signatures.

In an alternative embodiment, data streams to the primary processor 12 and/or the reconfigurable event driven hardware 14 may be combined or otherwise partitioned. In addition, data paths between the primary processor 12 and the reconfigurable event driven hardware 14 may be similarly combined or otherwise partitioned.

Figure 2:
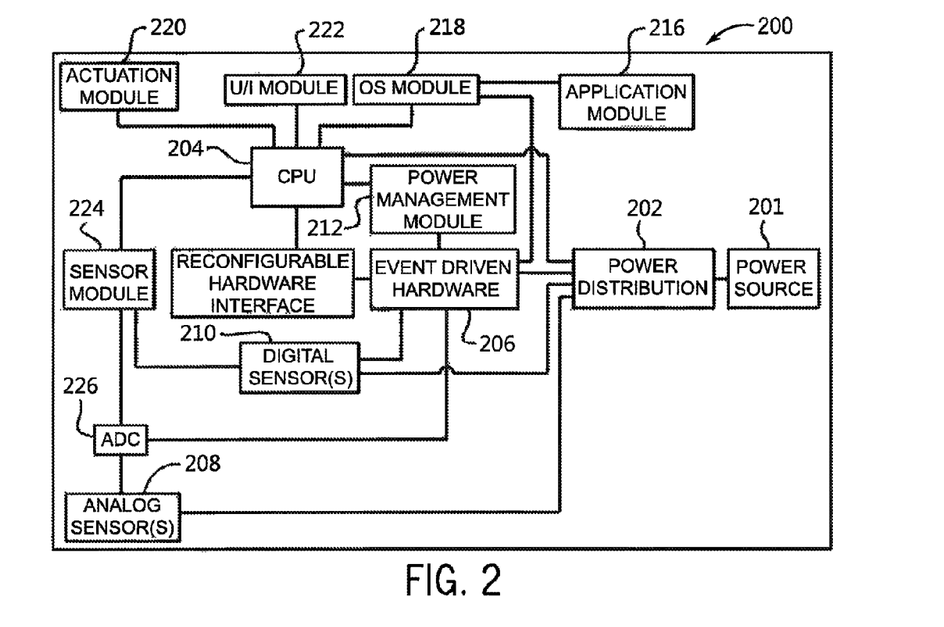
FIG. 2 is an architectural diagram of the system of FIG. 1, including power distribution and communication with software and related modules, in accordance with an embodiment of the present invention.

Referring now to FIG. 2, a detailed architectural diagram of the system of FIG. 1, including power distribution and communication with software and related modules, is shown in accordance with an embodiment of the present invention. A power source 201 coupled to a power distribution module 202 provides power to various modules in the system, including the primary processor 204, the reconfigurable event driven hardware 206, the analog sensors 208 and the digital sensors 210.

The reconfigurable event driven hardware 206 interacts with the primary processor 204 through the processor power management module 212 and the processor reconfigurable hardware interface module 214. An application module 216 in need of continuous sensing capability makes a request to the operating system ("OS") module 218 and provides details about the sensors to be monitored and signatures to be identified. This information is in turn communicated to the primary processor 204 which configures the reconfigurable event driven hardware 206 with appropriate parameters via the processor reconfigurable hardware interface module 214.

At this point, the primary processor 204 can go into sleep/idle or a low power consumption mode to conserve power while the reconfigurable event driven hardware 206 sets up links with the appropriate sensors and continuously monitors for the trigger signatures. In the case when the reconfigurable event driven hardware 206 identifies a trigger signature, it communicates with the processor power management module 212 to determine the present state of the primary processor 204. If the primary processor 204 is in a sleep/idle or a low power consumption mode, the reconfigurable event driven hardware 206 requests the processor power management module 212 to bring the primary processor 204 into an active state, then details of the identified trigger signatures are communicated to the primary processor 204 via the processor reconfigurable hardware interface module 214.

Upon receiving the details of the trigger signature, the primary processor 204 sends an interrupt to the OS module 218 communicating the present trigger signature occurrence, then invokes the continuous sensing application module 216. The application module 216 can then dynamically invoke software routines to respond to the specific signature. Based on the behavior coded in the invoked software routines, the application module 216 may request an action in to the trigger signature. This action may be realized, for example, via interaction with a user an actuation module 220, such as producing a sound, or user interface module 222, such a displaying to a screen.

Figure 3:
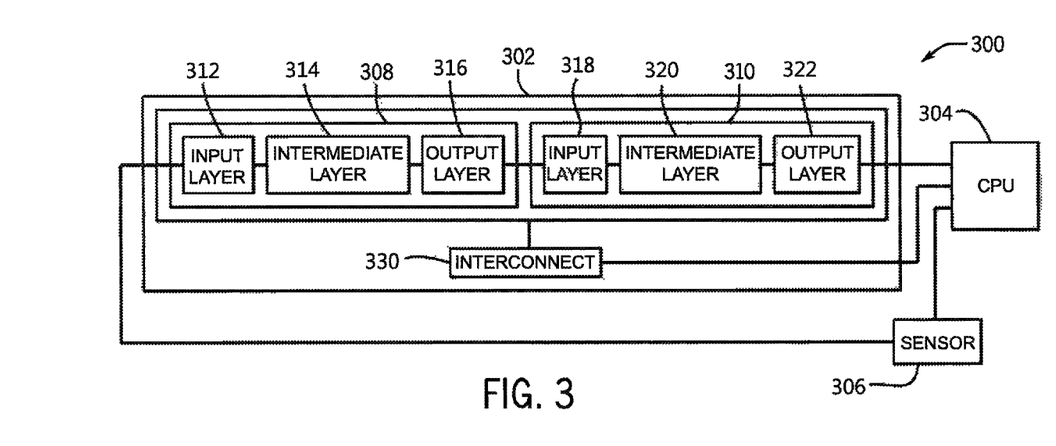
FIG. 3 is a logical diagram illustrating reconfigurable event driven hardware implemented using a reservoir computing, in accordance with an embodiment of the present invention.

Referring now to FIG. 3, a logical diagram illustrating reconfigurable event driven hardware 302 implemented using reservoir computing, is shown in accordance with an embodiment of the present invention. The reconfigurable event driven hardware 302 is coupled to a primary processor 304, and each of which are coupled to an electronic sensor 306, which may be one or more analog and/or digital sensors, as described above. In the mobile phone space, the electronic sensor 306 may include common sensors available such as accelerometers, gyroscopes, microphones, cameras, etc. For energy constrained medical applications, the electronic sensor 306 may include temperature sensors, pressure sensors, EEG sensors, EKG sensors, etc.

To achieve continuous sensing and trigger signature detection in the energy constrained environment, it is important that the reconfigurable event driven hardware 302 operate in an event driven manner. In other words, the occurrence of a particular spatial and/or temporal signature, sensed by the electronic sensor 306, subsequently drives a particular trigger.

It is also important that a capturing element 308 of the reconfigurable event driven hardware 302 has direct inputs from the electronic sensor 306, without requiring input from or the operation of the primary processor 304. Energy savings are achieved by the low power event driven operation of the reconfigurable event driven hardware 302 paired with the fact that primary processor 304 can operate in a sleep/idle or low power consumption mode until awoken by the reconfigurable event driven hardware 302.

The reconfigurable event driven hardware 302 may comprise the capturing element 308 and a detecting and/or classifying element 310. To achieve optimum power conservation in the energy constrained environment, in a preferred embodiment, the reconfigurable event driven hardware 302 may be implemented as a neural network, without the overhead of a low-power microcontroller, for example. Accordingly, a portion of the reconfigurable event driven hardware 302, such as capturing element 308, may be configured as an implementation of an "Echo State Network," or "Liquid State Machine," to capture the temporal behavior of the electronic sensor 306. Echo State Networks are described, for example, in "Real-Time Computing Without Stable States: A New Framework for Neural Computation Based on Perturbations," Maass, Wolfgang; Natschliger, Thomas; Markram, Henry (November 2002), and "Computational Models for Generic Cortical Microcircuits," Maass, Wolfgang; Natschläger, Thomas (2003), the contents of each of which are hereby incorporated by reference. In alternative embodiments, shift registers and/or finite state machines may be used in addition to or in substitution of an Echo State Network and/or Liquid State Machine.

Another portion of the reconfigurable event driven hardware 302, such as the detecting and/or classifying element 310, may be configured as a "Multi-Layered Perception Network" for detecting and/or classifying particular trigger signatures. Multi-Layered Perception Networks are described, for example, in "Artificial Intelligence: A Modern Approach," 2nd ed., Russell, Stuart J. and Norvig, Peter, Upper Saddle River, N.J., Prentice Hall (2003), the contents of which are hereby incorporated by reference.

Both the Echo State Network and the Multi-Layered Perceptron Network may be composed of digitally implemented "leaky integrate-and-fire neurons" operating in a clocked manner. The leaky integrate-and-fire neuron contains an internal state variable known as the membrane potential. On any particular cycle, each of the leaky integrate-and-fire neurons sums its inputs, adds them to the current membrane potential of the neuron, and subtracts a leakiness factor. If the membrane potential exceeds a threshold value, the neuron fires, and the firing becomes the input to other neurons in the following cycle. Afterwards, the membrane potential value is set to a reset value.

The neurons may utilize a small set of configurable parameters in order to achieve the desired leaky integrate-and-fire behavior. These include the membrane threshold value parameter, a positive (excitatory) connectivity strength parameter, a negative (inhibitory) connectivity strength parameter and a membrane leak value parameter. In one embodiment, for example, the threshold value may be an 8-bit value, the positive (excitatory) connectivity strength may be a 6-bit value, the negative (inhibitory) connectivity strength may be a 6-bit value and the membrane leak may be a 6-bit value.

The Echo State Network may be composed of a variable number of leaky integrate-and-fire neurons. These leaky integrate-and-fire neurons communicate with each other utilizing a random and sparse connectivity scheme.

As described above, the outputs of the electronic sensor 306 serve as the inputs to the capturing element 308 which may be an Echo State Network. In alternative embodiments, the outputs of the electronic sensor 306 could be buffered, applied to threshold and/or connected directly to a small subset of the leaky integrate-and-fire neurons in the Echo State Network, such as an input layer of neurons 312 of the capturing element 308. The random sparse connectivity of the Echo State Network embodied in the capturing element 308 allows these activations to propagate among the recurrently connected leaky integrate-and-fire neurons over time. As new inputs from the electronic sensor 306 activate the input layer of neurons 312, the state of the Echo State Network embodied in the capturing element 308 captures both the present sensory inputs as well as the sensory inputs of the recent past. This behavior is where the Echo State Network derives its name. That is, a snapshot of the Echo State Network describes the present input as well as the "echoes" remaining from previous sensory inputs. The input layer of neurons 312 may feed forward to an intermediate layer of neurons 314, which may, in turn, feed forward to an output layer of neurons 316, which may, in turn, couple to the detecting and/or classifying element 310.

The Multi-Layered Perceptron Network embodied in the detecting and/or classifying element 310 may also be composed of a variable number of leaky integrate-and-fire neurons. The Multi-Layered Perceptron Network is used to characterize and classify the trigger signatures that have been captured by the Echo State Network embodied in the capturing element 308. That is, the temporal activity of the electronic sensor 306 is first captured by the Echo State Network embodied in the capturing element 308, and then the Multi-Layered Perceptron Network embodied in detecting and/or classifying element 310 detects trigger signatures by classifying the behavior of the Echo State Network.

The connectivity of the Multi-Layered Perceptron Network embodied in the detecting and/or classifying element 310 must be configured for the particular trigger signatures of interest. This connectivity may first be configured in software based on prototype trigger signatures provided by the user. The Multi-Layered Perceptron Network may comprise an input layer of neurons 318, which may, in turn, feed forward to an intermediate layer of neurons 320, which may, in turn, feed forward to an output layer of neurons 322, which may, in turn, couple to the primary processor 304.

The output layer of neurons 322 may then determine the handling and power mode of the overall energy constrained system. For example, a particular neuron in the output layer of neurons 322 may detect a trigger signature based on accelerometer data that indicates a user has entered the driver seat of the car. The output layer of neurons 322 may then can wake up the primary processor 304 and indicate that this event has occurred, and the primary processor 304 may, in turn, take the appropriate actions associated with this trigger signature.

As described above, the computation the leaky integrate-and-fire neuron performs is based on its parameterized membrane leak, the electronic sensor 306 and other connected leaky integrate-and-fire neurons. A reconfigurable event driven interconnect 330 embodied in the reconfigurable event driven hardware 302 allows these leaky integrate-and-fire neurons to be configured into the various structures, including the Echo State Network embodied in the capturing element 308 and the Multi-Layered Perceptron Network embodied in the detecting and/or classifying element 310, and defines the leaky integrate-and-fire neuron parameters.

In preferred embodiment, the Echo State Network embodied in the capturing element 308 may utilize a sparse connectivity which can be defined for a particular trigger signature sensing application of interest. Within the Echo State Network, the reconfigurable event driven interconnect 330 uses a sparse and random connectivity, with the probability of connection proportional to the physical distance between the leaky integrate-and-fire neurons from which it is composed. The connectivity of the Multi-Layered Perceptron Network embodied in the detecting and/or classifying element 310 can be derived based on prototype trigger signature examples input to the Echo State Network.

Finally, the reconfigurable event driven interconnect 330 can be configured so the leaky integrate-and-fire neurons of the Echo State Network embodied in the capturing element 308 serve as the inputs to the Multi-Layered Perceptron Network embodied in the detecting and/or classifying element 310. In an embodiment, the Echo State Network may comprise, for example, about 216 leaky integrate-and-fire neurons, with six input layer neurons connected to 36 neurons, operating in a clocked manner.

A software development environment may be used to allow the configuration of the reconfigurable event driven hardware 302 for various trigger signature detections. The software development environment may run on the primary processor 304, or from another general purpose processor or CPU capable of running the software development tools that can be interfaced with the reconfigurable event driven hardware 302. The software may be used to configure the reconfigurable event driven hardware 302 as a number of leaky integrate-and-fire neurons, and via the reconfigurable event driven interconnect 330, with a topology necessary to implement an Echo State Network and Multi-Layered Perceptron Network.

The software may also be used to set the values for the various parameters of the leaky integrate-and-fire neurons and the connectivity structures as described above.

The software may also utilize trigger signatures to automatically configure the reconfigurable event driven interconnect 330 and the reconfigurable event driven hardware 302. For example, detecting a person entering the driver seat of an automobile based on accelerometer data may be of high importance. A developer could collect a number of predetermined trigger signatures based on collected accelerometer data which may be used in conjunction with the software development environment to configure the reconfigurable event driven interconnect 330 and the reconfigurable event driven hardware 302. Here, a software model of the Echo State Network and Multi-Layered Perceptron Network may be initialized, but the configuration of the reconfigurable event driven interconnect 330 may not yet be known. The predetermined trigger signatures may be used as inputs to the software model of the reconfigurable event driven hardware 302, and the connectivity of the Multi-Layered Perceptron is learned using back-propagation, a training method common to software neural network implementations. Once the reconfigurable event driven hardware 302 has been properly trained for the necessary set of trigger signatures, the software development environment may be used to configure the actual hardware.

An example of how the reconfigurable event driven hardware 302 can provide energy efficient continuous sensing is in the context of detecting gestures based on mobile phone accelerometer data. Here, the electronic sensor 306 may be a 3-axis accelerometer common in many mobile phone devices. Using the software development environment described above, an Echo State Network composed, for example, of about 216 leaky integrate-and-fire neurons may be used to capture the current and previous sensory data from the 3-axis accelerometer. In one embodiment, for example, a Multi-Layered Perceptron Network may be configured of about 227 leaky integrate-and-fire neurons, with three of these neurons being dedicated as output layer neurons. Using the software development environment along with prototype trigger signatures, the Multi-Layered Perceptron Network may be trained via back-propagation to distinguish between three particular gestures.

Using this general approach, the reconfigurable event driven hardware 302 could be further configured to recognize any number of distinct gestures based on accelerometer data. Accordingly, the rest of the mobile phone could be powered down into a sleep/idle or low power consumption mode, until a particular trigger signature gesture was detected to reactivate the device.

Figure 4:
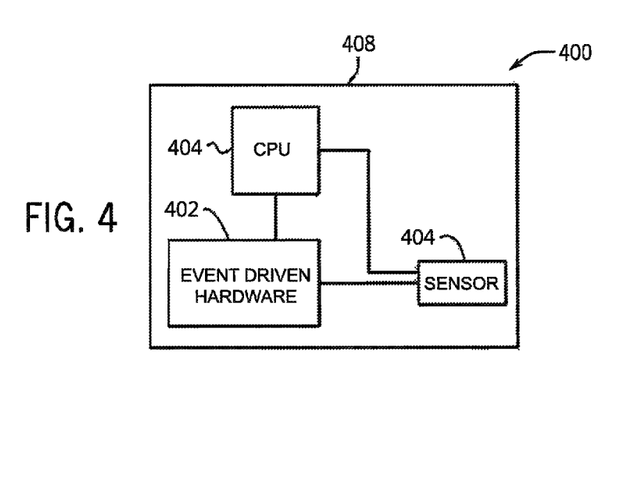
FIG. 4 is a logical diagram illustrating an exemplary embodiment of the present invention in which the primary processor, the electronic sensor and the reconfigurable event driven hardware are integrated within the same enclosure.

Referring now to FIG. 4, a logical diagram illustrating an exemplary embodiment of the present invention is shown. A reconfigurable event driven hardware 402 is coupled to a primary processor 404, each of which is coupled to an electronic sensor 406. Here, the reconfigurable event driven hardware 402, the primary processor 404 and the electronic sensor 406 are integrated within a single enclosure 408, which is the energy constrained device.

Figure 5:
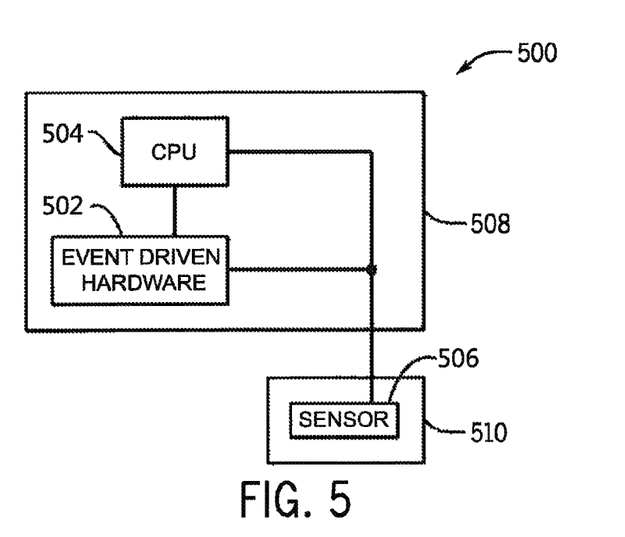
FIG. 5 is a logical diagram illustrating an exemplary embodiment of the present invention in which the primary processor and the reconfigurable event driven hardware are integrated within the same enclosure, and the electronic sensor is in a separate, external enclosure.

Referring now to FIG. 5, a logical diagram illustrating another exemplary embodiment of the present invention is shown. Similarly, a reconfigurable event driven hardware 502 is coupled to a primary processor 504, and each of which is coupled to an electronic sensor 506. However, here the reconfigurable event driven hardware 502 and the primary processor 504 are integrated within a single enclosure 508, and the electronic sensor 506 is in a separate, external enclosure 510.

Figure 6:
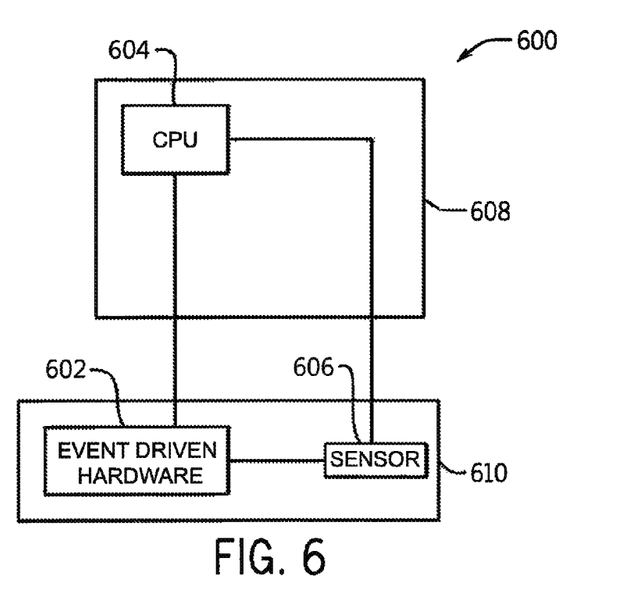
FIG. 6 is a logical diagram illustrating an exemplary embodiment of the present invention in which the reconfigurable event driven hardware and the electronic sensor are integrated within the same enclosure, and the primary processor is in a separate, external enclosure.

Referring now to FIG. 6, a logical diagram illustrating yet another exemplary embodiment of the present invention is shown. Similarly, a reconfigurable event driven hardware 602 is coupled to a primary processor 604, each of which is coupled to an electronic sensor 606. However, here the reconfigurable event driven hardware 602 and the electronic sensor 606 are integrated within a single enclosure 610, and the primary processor 604 is in a separate, external enclosure 608. It may now be appreciated that there are many integration possibilities for interfacing reconfigurable event driven hardware with a primary processor and available sensors that enable low-power continuous sensing.

One or more specific embodiments of the present invention have been described above. It is specifically intended that the present invention not be limited to the embodiments and/or illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor" can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

All of the publications described herein including patents and non-patent publications are hereby incorporated herein by reference in their entireties.

What is claimed is:

1. A method for analyzing a sensory stream from an electronic sensor in an energy-constrained environment, the method comprising:
   (a) configuring a reconfigurable event driven hardware in communication with a plurality of electronic sensory to detect a trigger signature from a sensory stream of a sensor to be monitored from among the plurality of electronic sensors as indicated by an application, wherein the reconfigurable event driven hardware includes reservoir computing implementing:
      (i) a capturing element configured to capture a temporal behavior of the sensory stream; and
      (ii) a classifying element configured to classify an output of the capturing element to identify the trigger signature, and
   wherein an interconnect allows configuring the capturing element and the classifying element into structures defined for the trigger signature, the structures each comprising a plurality of neurons having defined neuron parameters;
   (b) placing a processor in a low power consumption mode while the reconfigurable event driven hardware monitors the sensory stream to detect the trigger signature;
   (c) after step (b), upon the reconfigurable event driven hardware detecting the trigger signature, communicating details of the trigger signature to the processor, and invoking the application in response to the communication; and
   (d) reconfiguring the reconfigurable event driven hardware to detect a different trigger signature from the sensory stream during runtime of the application in response to a chance from the application.

2. The method of claim 1, further comprising using the processor to configure the reconfigurable event driven hardware to detect the trigger signature.

3. The method of claim 2, further comprising the reconfigurable event driven hardware continuously monitoring the sensory stream to detect the trigger signature while the processor is in the low power consumption mode.

4. The method of claim 2, further comprising configuring the reconfigurable event driven hardware via an Application Program Interface (API).

5. The method of claim 1, wherein the reservoir computing comprises a Liquid State Machine (LSM) comprised of a plurality of leaky-integrate-and-fire neurons.

6. The method of claim 5, wherein the reservoir computing further comprises a Multi-Layered Perceptron Network (MLPN) comprised of a plurality of leaky-integrate-and-fire neurons.

7. The method of claim 6, further comprising implementing the capturing element using the LSM and the classifying using the MLPN.

8. The method of claim 1, further comprising, after step (c), deactivating the reconfigurable event driven hardware and using the processor for continuously monitoring the sensory stream.

9. The method of claim 1, wherein the electronic sensor is at least one of an electrocardiograph and an electroencephalograph, and further comprising the configuring the reconfigurable event driven hardware to continuously monitor slow wave activity of a brain.

10. The method of claim 1, further comprising providing the electronic sensor and the reconfigurable event driven hardware in a first enclosure and providing the processor in a second enclosure separate from the first enclosure.

11. The method of claim 1, further comprising providing the processor and the reconfigurable event driven hardware in a first enclosure and providing the electronic sensor in a second enclosure separate from the first enclosure.

12. A system for analyzing a sensory stream in an energy-constrained environment comprising:
   plurality of electronic sensors producing sensory streams;
   a processor having a low power consumption mode; and
   a reconfigurable event driven hardware in communication with the plurality of electronic sensors and the processor, the reconfigurable event driven hardware being configured to detect a trigger signature from a sensory stream of a sensor to be monitored from among the plurality of electronic sensors as indicated by an application, wherein the reconfigurable event driven hardware includes reservoir computing implementing:
      (i) a capturing element configured to capture a temporal behavior of the sensory stream; and
      (ii) a classifying element configured to classify an output of the capturing element to identify the trigger signature, and
   wherein an interconnect allows configuring the capturing element and the classifying element into structures defined for the trigger signature, the structures each comprising a plurality of neurons having defined neuron parameters,
   wherein, upon the reconfigurable event driven hardware detecting the trigger signature, the reconfigurable event driven hardware is operable to communicate details of the trigger signature to the processor while the processor is in the low power consumption mode, and invoke the application in response to the communication, and
   wherein the processor is operable to reconfigure the reconfigurable event driven hardware to detect a different trigger signature from the sensory stream during runtime of the application in response to a change from the application.

13. The system of claim 12, wherein the processor configures the reconfigurable event driven hardware to detect the trigger signature.

14. The system of claim 13, wherein the reconfigurable event driven hardware continuously monitors the sensory stream to detect the trigger signature while the processor is in the low power consumption mode.

15. The system of claim 12, wherein the reservoir computing comprises a Liquid State Machine (LSM) comprised of a plurality of leaky-integrate-and-fire neurons.

16. The system of claim 15, wherein the reservoir computing further comprises a Multi-Layered Perceptron Network (MLPN) comprised of a plurality of leaky-integrate-and-fire neurons.

17. The system of claim 16, wherein the capturing element is implemented by the LSM and the classifying is implemented by the MLPN.

18. The system of claim 12, wherein the electronic sensor is at least one of an electrocardiograph and an electroencephalograph and the reconfigurable event driven hardware is configured to continuously monitor slow wave activity of a brain.

19. The system of claim 12, wherein the reconfigurable event driven hardware and one of the electronic sensor and the processor is provided in a first enclosure, and wherein one of the electronic sensor and the processor not provided in the first enclosure is provided in a second enclosure separate from the first enclosure.

* * * * *